United States Patent
Na (10) Patent No.: US 10,126,814 B2
(45) Date of Patent: Nov. 13, 2018

(54) APPARATUS AND METHOD FOR PROVIDING ADVERTISEMENT USING PUPIL TRACKING

(71) Applicant: SK Planet Co., Ltd., Gyeonggi-do (KR)

(72) Inventor: Seungwon Na, Seoul (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 26 days.

(21) Appl. No.: 15/314,273

(22) PCT Filed: Jan. 2, 2015

(86) PCT No.: PCT/KR2015/000017
§ 371 (c)(1),
(2) Date: Nov. 28, 2016

(87) PCT Pub. No.: WO2015/182846
PCT Pub. Date: Dec. 3, 2015

(65) Prior Publication Data
US 2017/0192501 A1    Jul. 6, 2017

(30) Foreign Application Priority Data

May 26, 2014    (KR) .................. 10-2014-0062989

(51) Int. Cl.
*G09G 5/00*     (2006.01)
*G06F 3/033*    (2013.01)
(Continued)

(52) U.S. Cl.
CPC .......... *G06F 3/013* (2013.01); *G02B 27/0093* (2013.01); *G06F 3/0346* (2013.01); *G06Q 30/0251* (2013.01); *G06F 3/033* (2013.01)

(58) Field of Classification Search
CPC ................................ G06F 3/013; G06F 3/012
See application file for complete search history.

(56) References Cited

U.S. PATENT DOCUMENTS

2012/0162204 A1    6/2012    Vesely et al.
2013/0187835 A1*   7/2013    Vaught ............... G06K 9/00604
                                                              345/8
(Continued)

FOREIGN PATENT DOCUMENTS

JP    2014-041259 A    3/2014
KR    10-2009-0041949 A    4/2009
(Continued)

*Primary Examiner* — Nan-Ying Yang
(74) *Attorney, Agent, or Firm* — Fenwick & West LLP (57) ABSTRACT

An apparatus and a method for providing an advertisement using pupil tracking are disclosed. The apparatus for providing an advertisement using pupil tracking is capable of designating a selection position within a display screen using a pupil tracking point generated by tracking a user's pupil and a direction point corresponding to the user's direction, determining a target object corresponding to the selection position from among the objects within the display screen, and providing a promotion content corresponding to the target object according to the user's response. By providing only a promotion content for a user's desired object within the display screen, it is possible to prevent expose of unnecessary information resulting from indiscriminate pupil tracking.

17 Claims, 6 Drawing Sheets

(51) Int. Cl.
 G09G 5/08 (2006.01)
 G06F 3/01 (2006.01)
 G02B 27/00 (2006.01)
 G06F 3/0346 (2013.01)
 G06Q 30/02 (2012.01)

(56) References Cited

U.S. PATENT DOCUMENTS

2013/0207896 A1* 8/2013 Robinson ............ G06F 3/04815
 345/158
2014/0307611 A1 10/2014 Tesanovic et al.
2014/0313308 A1* 10/2014 Wang ................. G06K 9/00604
 348/78
2016/0301539 A1 10/2016 Lindoff et al.

FOREIGN PATENT DOCUMENTS

KR 10-1343748 B1 1/2014
KR 10-2014-0040318 A 4/2014

\* cited by examiner

APPARATUS AND METHOD FOR PROVIDING ADVERTISEMENT USING PUPIL TRACKING

CROSS-REFERENCE TO RELATED APPLICATIONS

The present application is a national phase of PCT Application No. PCT/KR2015/000017 filed on Jan. 2, 2015, which claims priority to Korea patent application No. 10-2014-0062989 filed on May 26, 2014, which are incorporated herein by reference in their entireties.

TECHNICAL FIELD

The present invention relates to an apparatus and method for providing an advertisement through pupil tracking so as to offer promotion content for a user's intentionally gazing object from among various objects contained in a display screen.

BACKGROUND

Recently, advertisement solution techniques have been developed to provide an advertisement linked to a product contained in a video when a user is watching the video through a smart TV, a smart phone including a tablet, a notebook, or the like which embeds a 2D camera or more. Namely, when a consumer gazes at a certain product contained in a video and requires the exposure of an advertisement and detailed information about the product, related information is offered. This service may be linked to an advertising page of a product supplier, a page related to background music, an SNS communication channel associated with a product, and the like.

The above-mentioned advertisement solution technique is a service in the form of tracking pupils in a person's face and then offering detailed information of a product. This advertisement service often produces wrong results through unintended pupil tracking and also makes the mistake of frequently exposing undesired information. Namely, since product information is provided through pupil tracking even in case of no desire of a user, this may cause unfavorable results of exposing unnecessary information.

SUMMARY

An object of the present invention is to provide information about an object selected in accordance with a user's intention by using both a pupil tracking point created through pupil tracking and a direction point created using a pointing tool when selecting an object in a display.

Another object of the present invention is to maximize adverting effects and induce purchasing activity by providing an advertisement and detailed information about a product through a simple gazing and gesture to users who are watching a video.

In order to accomplish the above objects, an advertisement providing apparatus using pupil tracking according to the present invention includes a selection position designation unit configured to designate a selection position within a display screen by using both a pupil tracking point created by tracking a user's pupil and a direction point corresponding to a user's direction; a target determination unit configured to determine a target object corresponding to the selection position from among objects within the display screen; and an advertisement providing unit configured to provide promotion content corresponding to the target object depending on a user's response.

In this apparatus, the selection position designation unit may be further configured to designate the selection position by using a point where a straight line connecting the pupil tracking point and the direction point meets the display screen.

In this apparatus, the selection position designation unit may be further configured to create the pupil tracking point from a central point between two pupils or a recognized pupil between two pupils, depending on the number of pupils recognized through pupil tracking.

In this apparatus, the selection position designation unit may be further configured to create the direction point from a tip of a pointing tool used by a user for indicating the selection position.

In this apparatus, the selection position designation unit may be further configured to designate the selection position by using the point where the straight line connecting the pupil tracking point and the direction point meets the display screen for a predetermined time.

In this apparatus, when the straight line connecting the pupil tracking point and the direction point deviates from the display screen, the selection position designation unit may be further configured to show a deviating direction of the straight line through the display.

In this apparatus, the advertisement providing unit may include a user response interpretation unit for determining a user's response by using a motion of the direction point.

In this apparatus, the advertisement providing unit may further include an advertisement database for storing the promotion contents corresponding to the respective objects in the display screen.

Additionally, an advertisement providing method using pupil tracking according to the present invention includes steps of designating a selection position within a display screen by using both a pupil tracking point created by tracking a user's pupil and a direction point corresponding to a user's direction; determining a target object corresponding to the selection position from among objects within the display screen; and providing promotion content corresponding to the target object depending on a user's response.

In this method, the step of designating the selection position may include designating the selection position by using a point where a straight line connecting the pupil tracking point and the direction point meets the display screen.

In this method, the step of designating the selection position may include creating the pupil tracking point from a central point between two pupils or a recognized pupil between two pupils, depending on the number of pupils recognized through pupil tracking.

In this method, the step of designating the selection position may include creating the direction point from a tip of a pointing tool used by a user for indicating the selection position.

In this method, the step of designating the selection position may include designating the selection position by using the point where the straight line connecting the pupil tracking point and the direction point meets the display screen for a predetermined time.

In this method, when the straight line connecting the pupil tracking point and the direction point deviates from the display screen, the step of designating the selection position may include showing a deviating direction of the straight line through the display.

In this method, the step of providing the promotion content may include step of determining a user's response by using a motion of the direction point.

In this method, the step of providing the promotion content may include step of storing the promotion contents corresponding to the respective objects in the display screen.

According to the present invention, by providing promotion content for a user's desired object from among objects in a display screen, it is possible to prevent the exposure of unnecessary information resulting from indiscriminate pupil tracking.

Also, according to this invention, by providing an advertisement and detailed information about a product through a simple gazing and gesture to users who are watching a video, it is possible to maximize adverting effects and induce purchasing activity.

DETAILED DESCRIPTION

Hereinafter, embodiments of the present invention will be described with reference to the accompanying drawings. In this disclosure, well known techniques or elements may not be described or illustrated in detail to avoid obscuring the subject matter of the present invention. Also, through the whole drawings, the same or similar reference numerals denote corresponding features consistently.

The terms and words used in the following description and drawings are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents. The expression "first", "second", etc. used in various embodiments of the present disclosure may modify various elements of such embodiments but does not limit the corresponding elements. The above expressions do not limit the sequence and/or importance of the elements but may be used for distinguishing one element from other elements.

Figure 1:
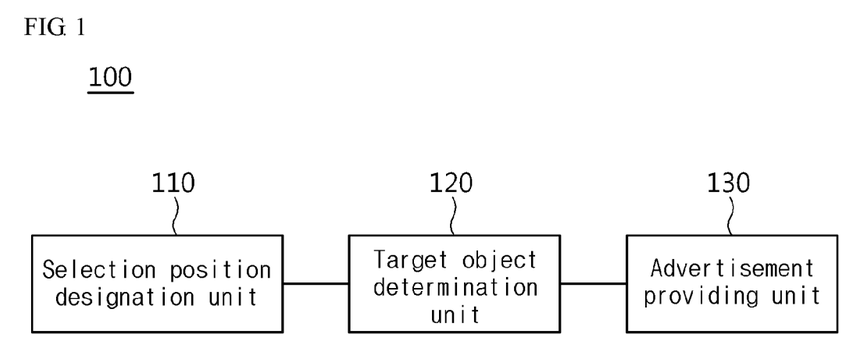
FIG. 1 is a block diagram illustrating an advertisement providing apparatus using pupil tracking according to an embodiment of the present invention.

FIG. 1 is a block diagram illustrating an advertisement providing apparatus using pupil tracking according to an embodiment of the present invention.

Referring to FIG. 1, the advertisement providing apparatus 100 that uses pupil tracking according to an embodiment of this invention may include a selection position designation unit 110, a target object determination unit 120, and an advertisement providing unit 130.

The selection position designation unit 110 may designate a selection position within a display screen by using both a pupil tracking point, created by tracking a user's pupil, and a direction point corresponding to a user's direction. For example, the pupil tracking point may be a central point between user's two pupils recognized through pupil tracking. If only one of right and left pupils is recognized through pupil tracking, the recognized pupil may be used for creating the pupil tracking point. Additionally, the direction point may be a pointing tool carried by a user to indicate an object in the display screen, or a user's finger.

The selection position may be designated using a point where a straight line connecting the pupil tracking point and the direction point meets the display screen. For example, when a user gazes at a certain object on the display screen by using a pointing tool, all of the pupil tracking point, the direction point and the object on the display screen may be aligned in a straight line. Therefore, when a connection line between the pupil tracking point and the direction point is extended and then meets the display screen at a certain point, this point may be designated as the selection position.

The pupil tracking point may be created using a central point between two pupils or any recognized pupil between two pupils, depending on the number of pupils recognized through pupil tracking. For example, if only one of right and left pupils is recognized when pupil tracking is performed using a camera embedded in the display, the recognized pupil may be used as the pupil tracking point and then connected to the direction point.

The direction point may be created using the tip of a pointing tool used by a user for indicating the selection position. For example, a user may use a pointing tool such as his/her finger or a pen so as to indicate an object on the display screen. The tip of such a finger or pen used for indication may be used for creating the direction point.

The selection position may be designated using a point where a straight line connecting the pupil tracking point and the direction point meets the display screen only for a predetermined time. For example, when a user intends to indicate a certain object on the display screen through a pointing tool, the user may see and pass unintentionally any other object before indicating a desired object. In this case, undesired information may be offered. Therefore, only when a desired object is indicated for a predetermined time, a corresponding point may be designated as the selection position.

If a straight line connecting the pupil tracking point and the direction point deviates from the display screen, a deviating direction of the straight line may be shown through the display. For example, since the selection position is designated by tracking a user's pupil even when a user gazes at other place, a straight line connecting the pupil tracking point and the direction point fails to reach the display screen. In this case, a deviating direction of the straight line may be shown through the display such that a user can adjust a point where the straight line meets the display screen.

The target determination unit 120 may determine a target object that corresponds to the selection position from among the objects within the display screen. For example, the target determination unit may identify the coordinates of the designated selection position in the display screen and then determine an object located at the identified coordinates. If there is no object at the selection position, a guiding message may be offered such that a user can designate any other selection position. Also, if there is no promotion content for an object located at the selection position, the target determination unit may inform a user of no information associated with the target object and guide the user to designate other selection position.

The advertisement providing unit 130 may provide promotion content corresponding to the target object in reply to a user's response. For example, if any target object is determined in the display screen, the advertisement providing unit may stop the display screen for a while and offers a user a query about whether to provide an advertisement or detailed information about the target object.

At this time, the advertisement providing unit may determine a user's response by using a motion of the direction point. For example, when a user's finger or pen is moved in any direction, resultant variations may be applied to the direction point. Each variation is mapped to a particular command associated with a user's response. Therefore, when a certain variation is recognized, a particular command corresponding to the variation may be performed.

The respective objects in the display screen may have promotion contents which are stored. For example, regarding each of various objects contained in an image being displayed, a related advertisement may be offered from sellers that sell a product corresponding to each object. Such advertisements may be stored in an advertisement database and, when a user determines the target object and requests the provision of an advertisement, may be retrieved and then provided. If there is no advertisement about the target object, the advertisement providing unit may search for and provide detailed information or the like about the target object by using any external service through Internet.

As discussed hereinbefore, the advertisement providing apparatus 100 using pupil tracking may provide promotion content for a product, intentionally indicated by a user, within the display screen, thereby maximizing adverting effects and also inducing purchasing activity.

Figure 2:
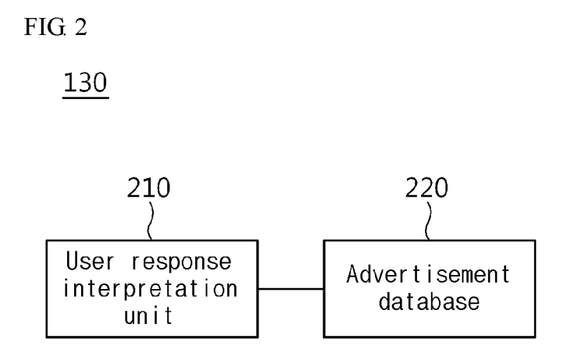
FIG. 2 is a diagram illustrating an advertisement providing unit according to an embodiment of the present invention.

FIG. 2 is a diagram illustrating an advertisement providing unit according to an embodiment of the present invention.

Referring to FIG. 2, the advertisement providing unit 130 according to an embodiment of this invention may include a user response interpretation unit 210 and an advertisement database 220.

The user response interpretation unit 210 may determine a user's response by using a motion of the direction point. For example, when a user's finger or pen is moved in any direction, resultant variations may be applied to the direction point. Each variation is mapped to a particular command associated with a user's response. Therefore, when a certain variation is recognized, a particular command corresponding to the variation may be performed.

The advertisement database 220 may store promotion contents corresponding to the respective objects in the display screen. For example, regarding each of various objects contained in an image being displayed, a related advertisement may be offered from sellers that sell a product corresponding to each object. Such advertisements may be stored in the advertisement database and, when a user determines the target object and requests the provision of an advertisement, may be retrieved and then provided. If there is no advertisement about the target object, detailed information or the like about the target object may be searched for and provided using any external service through Internet.

Figure 3:
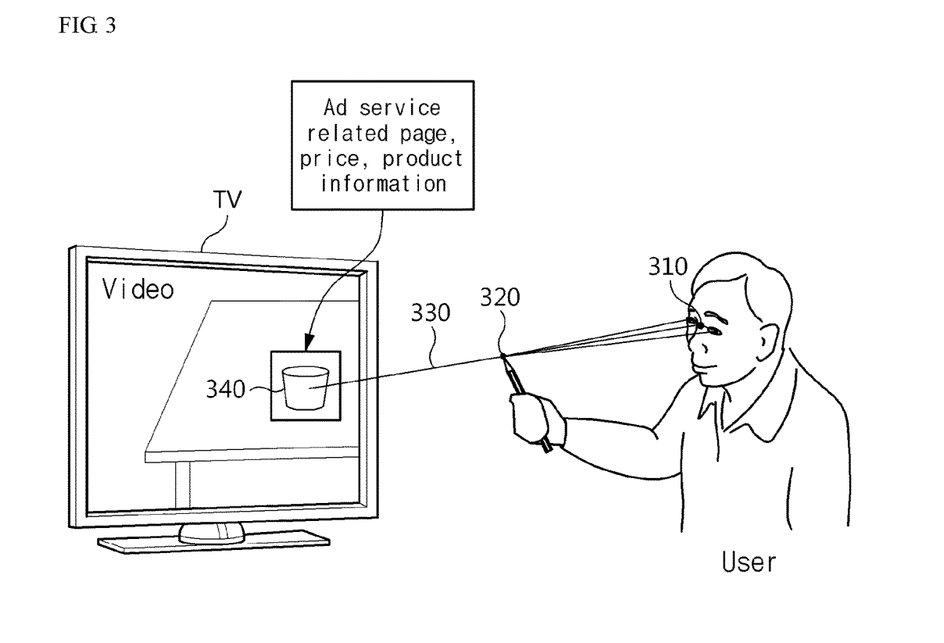
FIG. 3 is a diagram illustrating an advertisement providing process using pupil tracking according to an embodiment of the present invention.

FIG. 3 is a diagram illustrating an advertisement providing process using pupil tracking according to an embodiment of the present invention.

Referring to FIG. 3, in the advertisement providing process using pupil tracking according to an embodiment of this invention, a user who is watching a video through a smart TV may gaze at a desired object, from among objects contained the video, so as to receive promotion content.

When the user gazes at the object in a display screen, user's pupils may be recognized using a camera embedded in a display device. Then a central point between the recognized pupils may be determined as a pupil tracking point 310. If the user gazes at the object with only one eye, one pupil of the gazing eye may be determined as the pupil tracking point 310.

The user may use a pointing tool so as to indicate a certain object in the display screen. A direction point 320 may be created using the tip of the pointing tool. Then a connection line 330 may be created by connecting the pupil tracking point 310 and the direction point 320.

The connection line 330 may be extended and then meets the display screen at a certain point, and this point may be designated as a selection position. A specific object corresponding to the selection position may be determined as a target object 340.

When the target object 340 is determined, a query about whether to provide an advertisement and detailed information about the target object 340 to the user may be offered to the user. Then the user may respond to the query by moving the pointing tool. For example, the user may move his or her finger or pen in any direction to apply a resultant variation to the direction point 320. Each variation is mapped to a particular command associated with a user's response. Therefore, when a certain variation is recognized, a particular command corresponding to the variation may be performed.

In reply to a user's response, promotion content of the target object 340 may be provided through the smart TV. For example, for the user who desires to see an advertisement of the target object and then purchase the target object, information about a shopping mall that sells the target object may be provided. Also, price information about the target object or purchasers' comments may be provided so as to induce the user to purchase the target object.

FIGS. 4 to 7 are diagrams illustrating a method for determining a target object by using a pupil tracking point and a direction point depending on pupil tracking according to an embodiment of the present invention.

Referring to FIGS. 4 to 7, the method for determining a target object by using a pupil tracking point and a direction point depending on pupil tracking according to an embodiment of this invention may have some cases depending on a pupil tracking angle or the number of recognized pupils.

Figure 4:
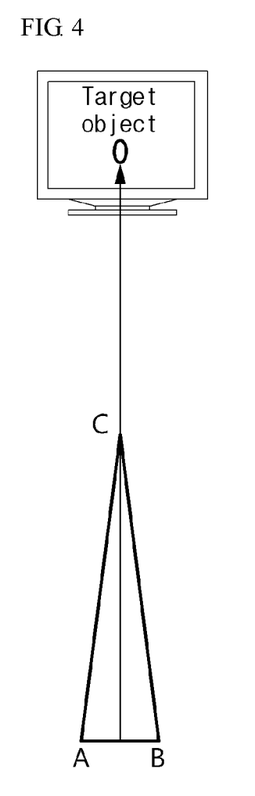
FIGS. 4 to 7 are diagrams illustrating a method for determining a target object by using a pupil tracking point and a direction point depending on pupil tracking according to an embodiment of the present invention.

FIG. 4 is a diagram illustrating a method for determining a target object when a user gazes frontward the target object on a display screen.

In FIG. 4, A and B may indicate user's left and right pupils, respectively, and C may indicate the direction point such as a user's finger tip or a pen tip. A, B and C may be created through pupil tracking and motion recognition and form vertexes of a triangle. A central point of a side formed by two vertexes A and B, namely, a central point between user's two pupils, may be determined as the pupil tracking point.

Also, the pupil tracking point which is a central point of a side formed by two vertexes A and B may be connected to the direction point which is the other vertex C, thereby creating a connection line. A point where the connection line meets the display screen may be designated as the selection position.

And also, a specific object corresponding to the selection position, from among various objects in the display screen, may be determined as the target object.

Figure 5:
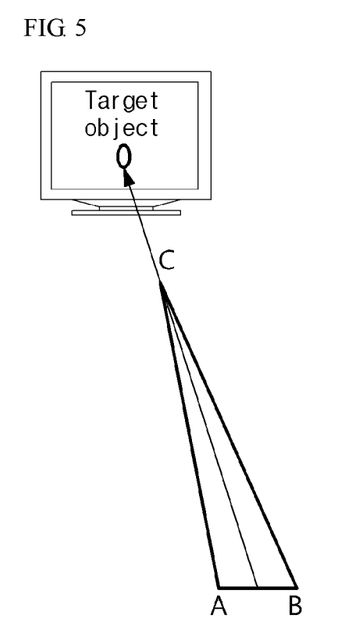
Figure 6:
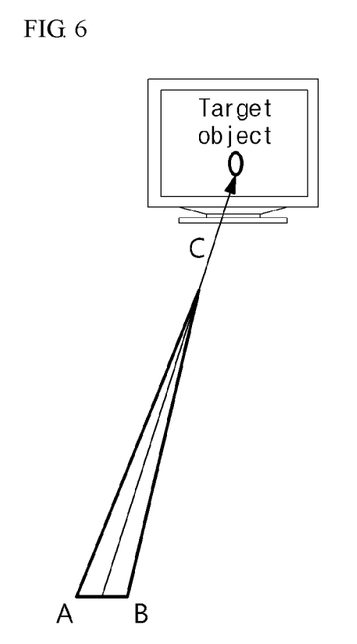

FIG. 5 is a diagram illustrating a method for determining a target object in case of gazing leftward the target object, and FIG. 6 is a diagram illustrating a method for determining a target object in case of gazing rightward the target object.

Figure 7:
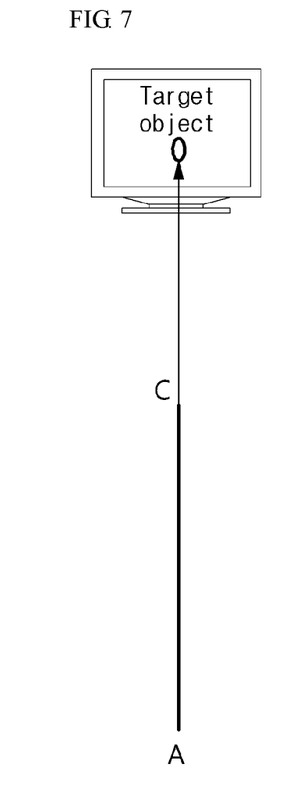

FIG. 7 is a diagram illustrating a method for determining a target object in case of recognizing only one of user's two pupils through pupil tracking.

In this case, A may be one of user's right and left pupils.

Since one pupil only is recognized, the pupil tracking point may be the center of the recognized pupil. Therefore, a point where the connection line connecting the pupil tracking point A and the direction point C meets the display screen may be designated as the selection position, and also an object corresponding to the selection position may be determined as the target object.

Figure 8:
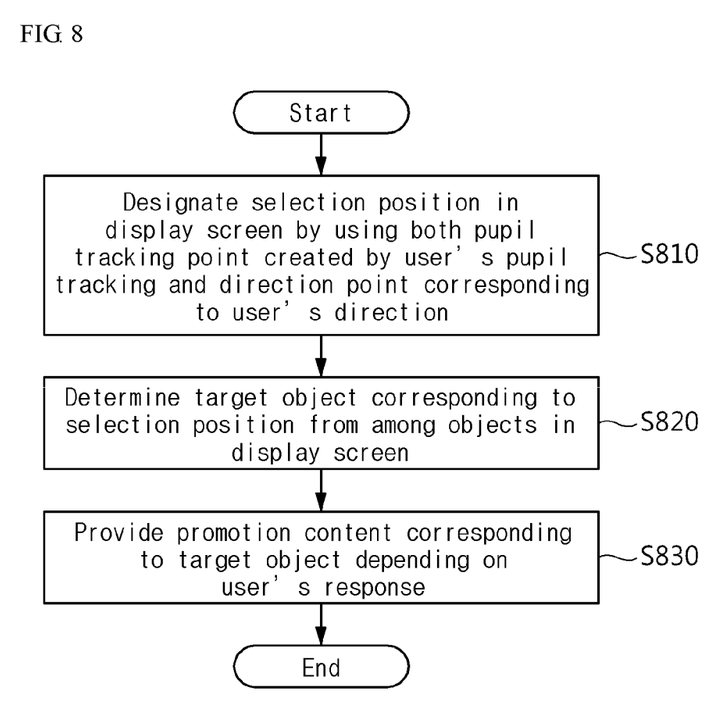
FIG. 8 is a flow diagram illustrating an advertisement providing method using pupil tracking according to an embodiment of the present invention.

FIG. 8 is a flow diagram illustrating an advertisement providing method using pupil tracking according to an embodiment of the present invention.

Referring to FIG. 8, the advertisement providing method using pupil tracking according to an embodiment of this invention may designate a selection position within a display screen by using both a pupil tracking point, created by tracking a user's pupil, and a direction point corresponding to a user's direction (S810). For example, the pupil tracking point may be a central point between user's two pupils recognized through pupil tracking. If only one of right and left pupils is recognized through pupil tracking, the recognized pupil may be used for creating the pupil tracking point. Additionally, the direction point may be a pointing tool carried by a user to indicate an object in the display screen, or a user's finger.

The selection position may be designated using a point where a straight line connecting the pupil tracking point and the direction point meets the display screen. For example, when a user gazes at a certain object on the display screen by using a pointing tool, all of the pupil tracking point, the direction point and the object on the display screen may be aligned in a straight line. Therefore, when a connection line between the pupil tracking point and the direction point is extended and then meets the display screen at a certain point, this point may be designated as the selection position.

The pupil tracking point may be created using a central point between two pupils or any recognized pupil between two pupils, depending on the number of pupils recognized through pupil tracking. For example, if only one of right and left pupils is recognized when pupil tracking is performed using a camera embedded in the display, the recognized pupil may be used as the pupil tracking point and then connected to the direction point.

The direction point may be created using the tip of a pointing tool used by a user for indicating the selection position. For example, a user may use a pointing tool such as his/her finger or a pen so as to indicate an object on the display screen. The tip of such a finger or pen used for indication may be used for creating the direction point.

The selection position may be designated using a point where a straight line connecting the pupil tracking point and the direction point meets the display screen only for a predetermined time. For example, when a user intends to indicate a certain object on the display screen through a pointing tool, the user may see and pass unintentionally any other object before indicating a desired object. In this case, undesired information may be offered. Therefore, only when a desired object is indicated for a predetermined time, a corresponding point may be designated as the selection position.

If a straight line connecting the pupil tracking point and the direction point deviates from the display screen, a deviating direction of the straight line may be shown through the display. For example, since the selection position is designated by tracking a user's pupil even when a user gazes at other place, a straight line connecting the pupil tracking point and the direction point fails to reach the display screen. In this case, a deviating direction of the straight line may be shown through the display such that a user can adjust a point where the straight line meets the display screen.

Additionally, the advertisement providing method using pupil tracking according to an embodiment of this invention may determine a target object that corresponds to the selection position from among the objects within the display screen (S820). For example, it is possible to identify the coordinates of the designated selection position in the display screen and then determine an object located at the identified coordinates. If there is no object at the selection position, a guiding message may be offered such that a user can designate any other selection position. Also, if there is no promotion content for an object located at the selection position, it is possible to inform a user of no information associated with the target object and guide the user to designate other selection position.

Additionally, the advertisement providing method using pupil tracking according to an embodiment of this invention may provide promotion content corresponding to the target object in reply to a user's response. For example, if any target object is determined in the display screen, the advertisement providing unit may stop the display screen for a while and offers a user a query about whether to provide an advertisement or detailed information about the target object.

At this time, the advertisement providing unit may determine a user's response by using a motion of the direction point. For example, when a user's finger or pen is moved in any direction, resultant variations may be applied to the direction point. Each variation is mapped to a particular command associated with a user's response. Therefore, when a certain variation is recognized, a particular command corresponding to the variation may be performed.

The respective objects in the display screen may have promotion contents which are stored. For example, regarding each of various objects contained in an image being displayed, a related advertisement may be offered from sellers that sell a product corresponding to each object. Such advertisements may be stored in an advertisement database and, when a user determines the target object and requests the provision of an advertisement, may be retrieved and then provided. If there is no advertisement about the target object, the advertisement providing unit may search for and provide detailed information or the like about the target object by using any external service through Internet.

As discussed hereinbefore, the advertisement providing method using pupil tracking may provide promotion content for a user's desired object from among objects in a display screen, thus preventing the exposure of unnecessary information resulting from indiscriminate pupil tracking.

The advertisement providing method using pupil tracking according to this invention may be implemented in the form of program commands executable through various computing means and then recorded in a computer-readable storage medium. The computer-readable storage medium may include program commands, data files, data structures, and the like, alone or in combination. The program commands recorded in the medium may be specially designed and configured for this invention or well known and useable in the art of computer software. The computer-readable storage medium, having recorded thereon, suitable for storing computer program command languages and data, includes magnetic media such as a hard disk, a floppy disk, and a magnetic tape, optical media such as a CD-ROM and a DVD, magneto-optical media such as a floptical disk, and semiconductor memories such as a ROM, a RAM, and a flash memory. A processor and memory may be supplemented by or integrated with specific-purpose logical circuit. Program commands may include high-class language codes, which can be executed in a computer by using an interpreter, as well as machine codes made by a compiler. The aforementioned hardware device may be configured to operate as one or more software modules in order to perform the operation of this invention, and vice versa.

While this invention has been particularly shown and described with reference to an exemplary embodiment thereof, it will be understood by those skilled in the art that various changes in form and details may be made therein without departing from the spirit and scope of this invention as defined by the appended claims.

What is claimed is:

1. An apparatus for providing an advertisement by using pupil tracking, the apparatus comprising:
    a selection position designation unit configured to designate a selection position within a display screen by using both a pupil tracking point created by tracking a user's pupil and a direction point corresponding to a user's direction;
    a target determination unit configured to determine a target object corresponding to the selection position from among objects within the display screen; and
    an advertisement providing unit configured to provide promotion content corresponding to the target object depending on a user's response,
    wherein the selection position designation unit is further configured to designate the selection position by using a point where a straight line connecting the pupil tracking point and the direction point meets the display screen, and
    wherein when the straight line deviates from the display screen and thereby fails to reach the display screen, the selection position designation unit is further configured to show a deviating direction of the straight line on the display.

2. The apparatus of claim 1, wherein the selection position designation unit is further configured to create the pupil tracking point from a central point between two pupils or a recognized pupil between two pupils, depending on the number of pupils recognized through pupil tracking.

3. The apparatus of claim 2, wherein the selection position designation unit is further configured to create the direction point from a tip of a pointing tool used by a user for indicating the selection position.

4. The apparatus of claim 3, wherein the selection position designation unit is further configured to designate the selection position by using the point where the straight line connecting the pupil tracking point and the direction point meets the display screen for a predetermined time.

5. The apparatus of claim 1, wherein the advertisement providing unit includes a user response interpretation unit for determining a user's response by using a motion of the direction point.

6. The apparatus of claim 5, wherein the advertisement providing unit further includes an advertisement database for storing the promotion contents corresponding to the respective objects in the display screen.

7. A method for providing an advertisement by using pupil tracking, the method comprising steps of:
    designating a selection position within a display screen by using both a pupil tracking point created by tracking a user's pupil and a direction point corresponding to a user's direction;
    determining a target object corresponding to the selection position from among objects within the display screen; and
    providing promotion content corresponding to the target object depending on a user's response,
    wherein the step of designating the selection position includes designating the selection position by using a point where a straight line connecting the pupil tracking point and the direction point meets the display screen, and
    wherein when the straight line deviates from the display screen and thereby fails to reach the display screen, the step of designating the selection position includes showing a deviating direction of the straight line on the display.

8. The method of claim 7, wherein the step of designating the selection position includes creating the pupil tracking point from a central point between two pupils or a recognized pupil between two pupils, depending on the number of pupils recognized through pupil tracking.

9. The method of claim 8, wherein the step of designating the selection position includes creating the direction point from a tip of a pointing tool used by a user for indicating the selection position.

10. The method of claim 9, wherein the step of designating the selection position includes designating the selection position by using the point where the straight line connecting the pupil tracking point and the direction point meets the display screen for a predetermined time.

11. The method of claim 7, wherein the step of providing the promotion content includes step of determining a user's response by using a motion of the direction point.

12. The method of claim 11, wherein the step of providing the promotion content includes step of storing the promotion contents corresponding to the respective objects in the display screen.

13. A non-transitory computer-readable storage medium recording thereon a program for executing steps of:
    designating a selection position within a display screen by using both a pupil tracking point created by tracking a user's pupil and a direction point corresponding to a user's direction;
    determining a target object corresponding to the selection position from among objects within the display screen; and
    providing promotion content corresponding to the target object depending on a user's response,
    wherein the step of designating the selection position includes designating the selection position by using a point where a straight line connecting the pupil tracking point and the direction point meets the display screen, and
    wherein when the straight line deviates from the display screen and thereby fails to reach the display screen, the step of designating the selection position includes showing a deviating direction of the straight line on the display.

14. The apparatus of claim 1, wherein if there is no object at the selection position, the target determination unit is further configured to offer a guiding message allowing a user to designate other selection position.

15. The apparatus of claim 5, wherein variations of the motion of the direction point are respectively mapped to particular commands.

16. The method of claim 7, wherein if there is no object at the selection position, the step of determining the target object includes offering a guiding message allowing a user to designate other selection position.

17. The method of claim 11, wherein variations of the motion of the direction point are respectively mapped to particular commands.

* * * * *